No. 847,274. PATENTED MAR. 12, 1907.
E. BELKNAP.
ROLLER BEARING.
APPLICATION FILED JAN. 23, 1906.
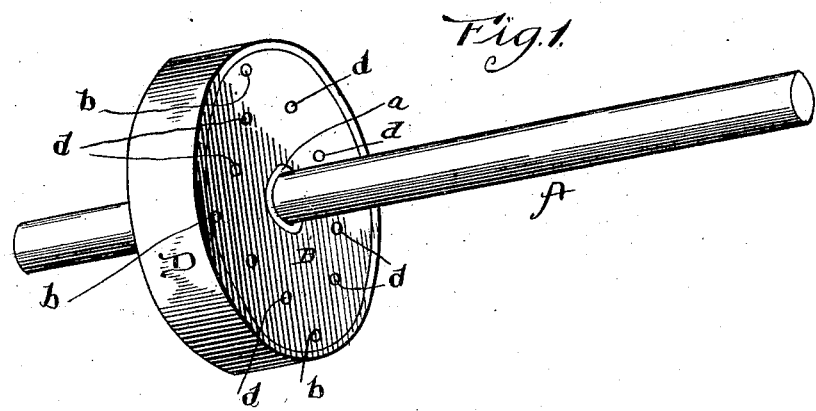
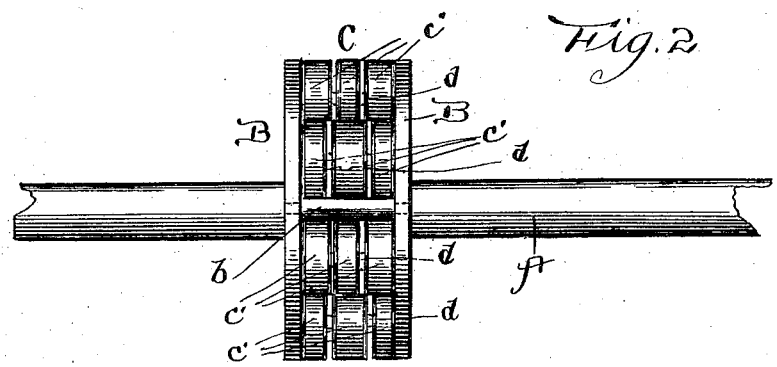
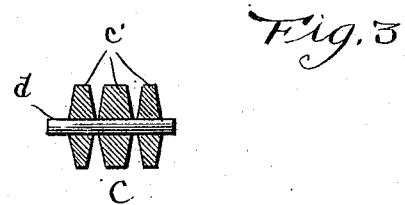
Witnesses:
Wm P. Bond
Oscar W. Bond
Inventor:
Ellsworth Belknap
By Banning & Banning
Attorneys.
THE NORRIS PETERS CO., WASHINGTON, D. C.

UNITED STATES PATENT OFFICE.

ELLSWORTH BELKNAP, OF POLO, ILLINOIS, ASSIGNOR TO WILLIAM C. ROSS, OF CHICAGO, ILLINOIS.

ROLLER-BEARING.

No. 847,274.  Specification of Letters Patent.  Patented March 12, 1907.

Application filed January 23, 1906. Serial No. 297,520.

*To all whom it may concern:*

Be it known that I, ELLSWORTH BELKNAP, a citizen of the United States, residing at Polo, in the county of Ogle and State of Illinois, have invented certain new and useful Improvements in Roller-Bearings, of which the following is a specification.

The object of this invention is to construct a roller-bearing which will furnish the requisite bearing-surface with but little, if any, wear and which will permit the rollers to give and take without impairing their efficiency in use and prevent any chipping or flaking of the roller in the event of uneven wear or vibration in use; and the invention consists in the features of construction and combinations of parts hereinafter described and claimed.

In the drawings, Figure 1 is a perspective view of the roller-bearing in its incased position; Fig. 2, an elevation with the outer bearing shell or casing removed; and Fig. 3, a detail, partly in section, showing one of the rollers and its journal-pin.

The roller-bearing is intended for use with shafts, axles, or other revoluble element and is shown in connection with a shaft or axle A, which can be of varying dimensions in cross-section, as usual with shafts and axles. At the point of location of the roller-bearing the shaft or axle has fixedly secured thereon a sleeve $a$, of hardened steel, forming the inner track or bearing-surface for the rollers. The roller-bearing, as shown, is formed of two circular side plates B, separated the required distance apart for the reception of the rollers and united one to the other by cross-pins, bolts, rivets, or other securing means. As shown, the cross pins or rods $b$ have a shouldered end to prevent the side plates or disks B from approaching each other and for holding the side plates or disks in the set position at the required distance apart for the reception of the rollers.

The rollers C in the arrangement shown are each formed of a center wheel $c$ and two outer wheels $c'$, united so as to revolve as one. The wheels $c$ and $c'$ for the plurality of rollers C are arranged in staggered relation— that is, a broad-tread center wheel and a narrow tread for the two outer wheels, with the broad-tread center wheel in coöperating relation with a narrow-tread center wheel $c$ on each side and with the narrow-tread outer wheels in coöperating relation with broad-tread outer wheels on each side, so that it will be impossible for the rollers to track and cut the tracks or bearing-surfaces against which they roll. Each roller C as a whole is fixedly mounted on a cross pin or journal $d$, made of pliable metal, such as wrought-iron, soft steel, copper, or other similar metal having resiliency and at the same time capable of giving in case of the rollers running out of true from any cause and by giving prevent any chipping or flaking or breaking or disruption of the roller in use. Each roller preferably is made of hard steel, but could be made of other metal with a case-hardened periphery or bearing-face, and preferably the several wheels composing each roller are narrower at the periphery or bearing-face than at the center, as shown in Fig. 3. The pliable-metal journal-pins $d$ have their bearing at each end in the side plates or disks B and are free to revolve in their bearings for the rollers to furnish a rolling support for the shaft or axle through the travel of the track or bearing-face $a$ on or against the periphery of the rollers C in use.

The rollers are incased by a hoop or band D, preferably of hardened steel and forming the outer trackway or bearing-face for the rollers and also serving as a shield to prevent dust, dirt, and similar particles from entering the roller-bearing and interfering with the operation thereof. It will be seen that by reason of the track or bearing $a$ the side plates or disks B and the outer band or hoop D the plurality of rollers constituting the roller-bearing are effectively guarded from the entrance of dust, dirt, and foreign particles, and at the same time the plurality of rollers C, of hardened steel or having case-hardened peripheries, travel on an outer and inner trackway or bearing-face, so that in use but little wear can possibly take place between the rollers and the tracks or bearing-faces, thus insuring long life for the roller-bearing without impairment of its efficiency. The arranging of the plurality of rollers C in staggered relation with alternating broad and narrow center and outer treads prevents any tracking of the rollers and insures a uniform wear on the outer and inner tracks or bearing-faces. The mounting of each roller C on a journal-pin of pliable metal permits the roller to give and take in use without any liability of chipping or flaking the roller or breaking any of the parts in the event of an uneven or non-uniform travel from any cause.

The roller-bearing of the present invention is of simple construction, but will be found efficient and reliable in use. The plurality of rollers and the tracks or bearing-faces therefor are protected against the admission of dirt and foreign particles. The rollers are of hardened material and travel on tracks or bearing-faces, also of hardened material, reducing the wear to a minimum and decreasing the friction in use. The give and take allowed by the pliable-metal journal-pins prevents injurious effects to the rollers or to the tracks or bearing-faces. The form of the roller-bearing is one which will permit of its ready insertion in a journal-box or other support, and when in place a roller-bearing is furnished which has all the features and advantages above enumerated.

What I claim as new, and desire to secure by Letters Patent, is—

In a roller-bearing, the combination of an inner hardened-metal trackway, an outer hardened-metal trackway, a plurality of hardened-metal sectional rollers between the two trackways, each section of each roller wider at the base than at the periphery and each roller formed of wide and narrow separated sections with the rollers arranged in staggered relation for wide and narrow sections to oppose each other on adjacent rollers, a pair of side plates between which the plurality of rollers are mounted, and a journal-pin of pliable metal for each roller and supported in the side plates and having the sectional roller fixed thereon, substantially as described.

ELLSWORTH BELKNAP.

Witnesses:
 OSCAR W. BOND,
 WALKER BANNING.